United States Patent [19]

Li

[11] Patent Number: 5,634,125

[45] Date of Patent: May 27, 1997

[54] SELECTING BUCKETS FOR REDISTRIBUTING DATA BETWEEN NODES IN A PARALLEL DATABASE IN THE QUIESCENT MODE

[75] Inventor: Shih-Gong Li, Austin, Tex.

[73] Assignee: International Business Machines Corporation, Armonk, N.Y.

[21] Appl. No.: 116,086

[22] Filed: Sep. 2, 1993

[51] Int. Cl.$^6$ .................................................. G06F 17/30
[52] U.S. Cl. .................................................. 395/619
[58] Field of Search .................................. 395/600, 425, 395/200, 650, 619; 364/DIG. 1, DIG. 2

[56] References Cited

U.S. PATENT DOCUMENTS

| | | | |
|---|---|---|---|
| 4,466,060 | 8/1984 | Riddle | 395/200.15 |
| 4,644,496 | 2/1987 | Andrews | 395/800 |
| 4,951,225 | 8/1990 | Lee et al. | 395/64 |
| 4,974,224 | 11/1990 | Boone | 370/94.1 |
| 4,974,256 | 11/1990 | Cyr et al. | 379/113 |
| 4,999,833 | 3/1991 | Lee | 370/94.1 |
| 5,047,918 | 9/1991 | Schwartz et al. | 395/600 |
| 5,053,950 | 10/1991 | Naganuma et al. | 395/650 |
| 5,131,087 | 7/1992 | Warr | 395/440 |
| 5,191,578 | 3/1993 | Lee | 370/63 |
| 5,283,897 | 2/1994 | Georgiadis et al. | 395/650 |
| 5,317,568 | 5/1994 | Bixby et al. | 370/85.6 |
| 5,325,505 | 6/1994 | Hoffecker et al. | 395/425 |
| 5,423,037 | 6/1995 | Hvasshovd | 395/600 |

OTHER PUBLICATIONS

IBM Technical Disclosure Bulletin vol. 32, No. 4A, Sep. 1989. Generalization of Min–Cut Partitioning To Three Structures, pp. 315–322.

Ehrenreich, D., "Rightsizing: redistributing the electronic workload". Telecommunications, vol. 26, No. 6 (Jun./1992), pp. 59–62.

Rahm, E. et al., "Analysis of Dynamic load balancing strategies for parallel shared nothing database systems." Proc. Of 19th Internat'l Conf. On Very Large Data Bases, 24–27 Aug. 1993, pp. 182–193.

Barlos, F. et al., "On the Development of a Site selection optimizer for distributed and parallel database systems." Proc. Of Conf. On Information and Knowledge Management (CIKM-93), 1–5 Nov. 1993, pp. 684–693.

Primary Examiner—Thomas G. Black
Assistant Examiner—Maria N. Von Buhr
Attorney, Agent, or Firm—Jeffrey S. LaBaw

[57] ABSTRACT

A method, system and program for determining which data stored in the nodes in a parallel database to redistribute to a receiving node. First, an average workload for the nodes within the parallel database is calculated based on the total workload divided by the number of existing and new nodes. Next, a set of transmitting nodes is established each of which has a workload which exceeds the average workload. A set of data structures which when redistributed from the transmitting node to the receiving node will lower the transmitting node workload to equal or slightly greater than the average workload is selected. Finally, the set of data structures is redistributed from the transmitting node to the receiving node.

15 Claims, 10 Drawing Sheets

RELATIONAL DATABASE TABLE

DATA REDISTRIBUTION PROCESS FOR ADDING A NEW NODE IN INCREMENTAL MODE

TABLE SCAN PROCESS

SELECTING BUCKETS FOR REDISTRIBUTING DATA BETWEEN NODES IN A PARALLEL DATABASE IN THE QUIESCENT MODE

BACKGROUND OF THE INVENTION

This invention relates generally to data messaging retrieval and storage in a data processing system. More particularly, it relates to determining a set of data structures from which data may be distributed between nodes in a parallel database system.

Databases have become the subject of significant recent interest, not only because of the increasing volume of data being stored and retrieved by computerized databases but also by virtue of the data relationships which can be established during the storage and retrieval processes.

In the last decade, database system developers have turned their attention toward parallel processing platforms, because a parallel processing system's cost/performance ratio is often superior to that of conventional mainframes. Set-oriented database systems, like relational database systems, are particularly well-suited to parallel processing since the database can be spread across the multiple computers or "nodes" in the system, and requests against the database can thus be executed in parallel. A generic parallel database system is characterized by a cluster of powerful, inexpensive microprocessor-based computers, each of which includes one of more disk storage devices with high performance and capacity. The nodes are interconnected using a shared communication medium. The cluster uses standard "off the shelf" microprocessor and workstation hardware products to take advantage of the high performance, lower cost, and higher reliability found in commodity components. When the database size or workload grows near the capacity of the system, more nodes can be added to extend that capacity.

In such a system, the database is distributed across the nodes; each node stores a fraction of the database. Likewise, the workload is distributed across the nodes: requests are sent to the nodes that contain the desired data and are executed there. Consequently, data placement determines how well the workload is balanced across the nodes, and how well the system performs as a whole. In many cases, the best performance can be obtained by spreading the workload as evenly as possible across all of the nodes. However, in an initially balanced system, the type and frequency of requests will change over time, data will be added to and deleted from the database over time, causing the workload to shift over time. Eventually, the system will become imbalanced across the nodes. Thus, the data will occasionally have to be redistributed to rebalance the load. Also, as nodes are added or deleted from the system, the data will have to be redistributed across the new number of nodes.

In a Parallel Database (PDB) System, data records are partitioned into data structures hereinafter referred to as "buckets". All the data records belonging to a bucket should always be placed into a single node. When adding new nodes into the PDB system, "buckets" of data must be moved from the existing nodes to the new nodes. A logical link is established with a predefined number of communication buffers for sending data records from the old residing node to the new node. As most relational database systems do not support a physical bucket in their storage organization, a table scan is required to select the to-be-moved records into communication buffers for redistribution. Because the table scan operation requires a table lock, it is logical to lock the same table on every PDB node to obtain the exclusive right on this particular table for data integrity and data placement consistency. Thus, every node will execute based on the same table sequence for data redistribution. However, the table locking makes performance one of the primary concerns for the operation of adding a new node. The faster the locks can be released, the less impact to the other ongoing transactions in PDB system.

The redistribution of data within a parallel database is traditionally done in a quiescent mode or a dynamic mode. In a quiescent mode, all functions other than data redistribution are halted until the data redistribution is complete. In an on-line or dynamic mode, data redistribution takes place concurrently with other PDB tasks.

There are two modes which have been proposed for data redistribution in a parallel database system. In a quiescent mode, the PDB system halts all other operations until the entire data redistribution takes place. In an on-line or dynamic mode, data redistribution takes place concurrently with other PDB tasks. In a commonly assigned, copending application, Ser. No. 08/116,089 entitled "Selecting Buckets for Redistributing Data Between Nodes in a Parallel Database in the Incremental Mode" S. G. Li, pending, which is hereby incorporated by reference, a new incremental mode is introduced. In the incremental mode, a set of quiescent data redistribution slices of the time alternate within time dedicated to other PDB tasks.

A quiescent mode PDB operation blocks any other operations using PDB during its operation for adding or removing nodes in PDB system. When adding new nodes, it is necessary to redistribute data for both load balancing and data availability. Instead of reloading the entire database, another approach to redistributing data is moving a portion of data from the existing nodes to the new nodes. In PDB, the unit of data movement is the bucket. As load balancing is the primary goal of data redistribution, it should be considered when choosing the appropriate buckets for moving. Because there are so many buckets in a node, using the traditional mathematical programming method for choosing the buckets cannot guarantee a feasible solution efficiently.

This invention describes a technique that can efficiently select the buckets to move to the new nodes with load balancing considered.

SUMMARY OF THE INVENTION

These and other objects are accomplished by a method, system and program for determining which data stored in the nodes in a parallel database to redistribute to a receiving node. First, an average workload for the nodes within the parallel database is calculated based on the total workload divided by the number of existing and new nodes. Next, a set of transmitting nodes is established each of which has a workload which exceeds the average workload. A set of data structures which when redistributed from the transmitting nodes to the receiving node will lower the transmitting nodes workload to equal slightly greater than the average workload is selected. Finally, the set of data structures is redistributed from the transmitting nodes to the receiving node.

The process of selecting the data structures to be redistributed includes ordering a set of candidate data structures according to a redistribution value of the respective data structure. The workload associated with a first candidate data structured having a highest redistribution value is subtract from the transmitting node workload. The first candidate data structure is selected for the set of data structures to be redistributed, if a result of the substracting step is greater than or equal to the average workload. The receiving node is either a new node to the parallel database system or an underutilized node in the parallel database system.

BRIEF DESCRIPTION OF THE DRAWINGS

These features, advantages, objects and others will be more readily understood with reference to the attached drawings and following description.

DETAILED DESCRIPTION OF THE DRAWINGS

The invention may be run on a collection of computers including variety of computers made by different vendors under a number of different operating systems. Computers in the system could be, for example, a personal computer, a mini computer or mainframe computer. The computer network could be Local Area Network or a Wide Area Network or larger teleprocessing system. Although the specific choice of computer is limited only by disk and disk storage requirements, computers in the IBM PS/2 (TM) series of computers could be used in the present invention. For additional information on IBM's PS/2 series of computers, the reader is referred to *Technical Reference Manual Personal System/2Model 50, 60 Systems IBM Corporation*, Part No. 68X2224 Order Number S68X-2224 and *Technical Reference Manual Personal Systems/2 (model 80) IBM Corporation* Part No. 68X2256 Order Number S68X-2254. One operating system which an IBM PS/2 personal computer may run is IBM's OS/2 2.0 (TM) for more information on the IBM OS/2 2.0 operating system, the reader is referred to *OS/2 2.0 Technical Library, Programming Guide Vol.* 1, 2, 3 *Version* 2.00 Order Nos. 10G6261, 10G6495, 10G6494.

In the alternative, computer systems in the IBM RISC System/6000 (TM) line of computers which run on the AIX (TM) (TM) operating system could comprise the network. The various models of the RISC System/6000 are described in many publications of the IBM Corporation, for example, *RISC System/6000, 7073 and 7016 POWERstation and POWERserver Hardware Technical Reference*, Order No. SA23-2644-00. The AIX operating system is described in *General Concepts and Procedure—AIX Version* 3 *for RISC System/6000* Order No. SC23-2202-00 as well as other publications of the IBM Corporation.

Figure 1:
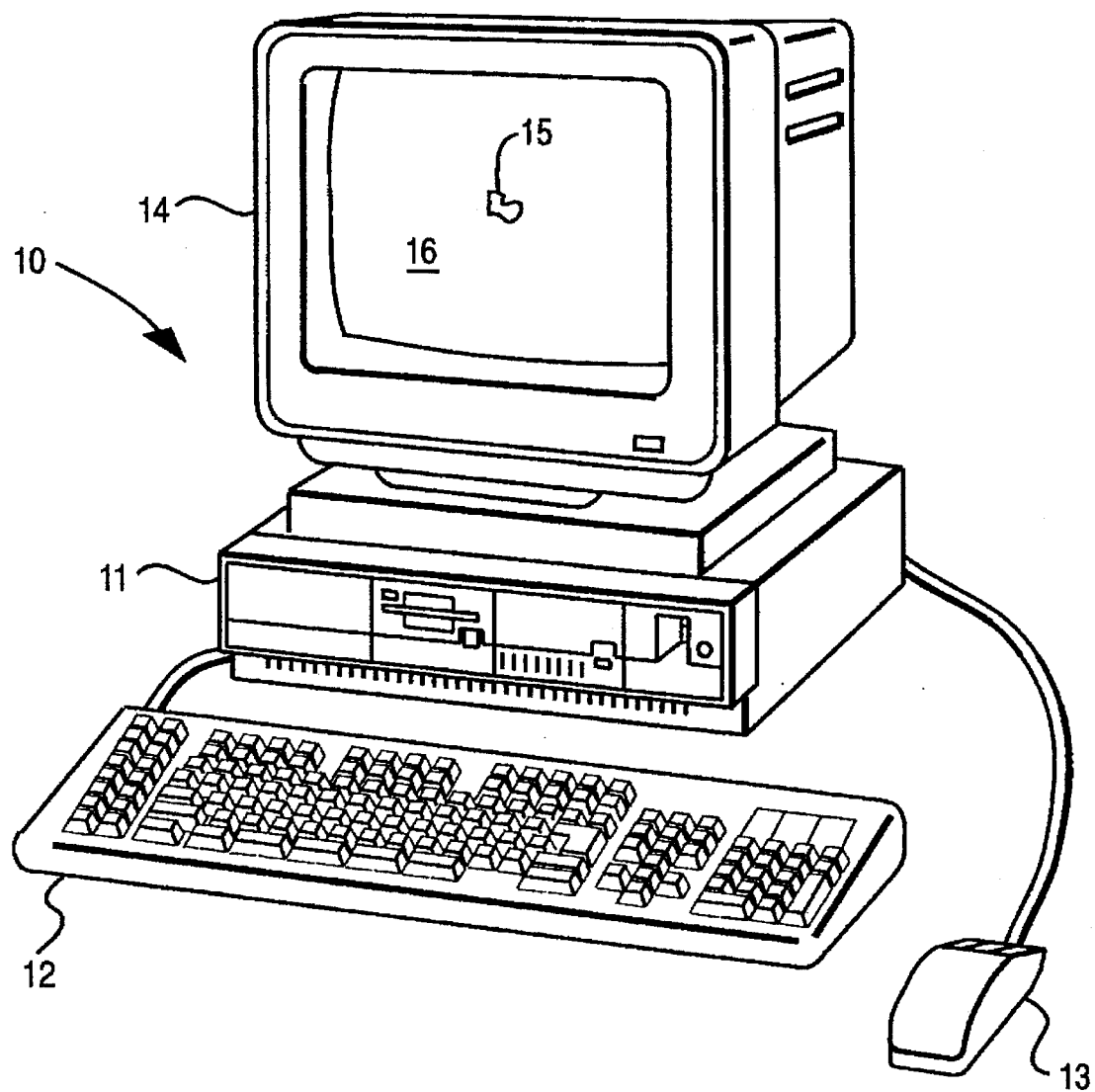
FIG. 1 depicts a single computer system including system unit, display, keyboard and mouse.

In FIG. 1, a computer 10, comprising a system unit 11, a keyboard 12, a mouse 13 and a display 14 are depicted. The screen 16 of display device 14 is used to present visual feedback to the user on parallel database operations. A graphical user interface supported by the operating system allows the user to use a point and shoot method of input by moving a mouse pointer 15 to an icon representing a selection at a particular location on the screen 16 and press one of the mouse buttons to perform a user command or selection.

Figure 2:
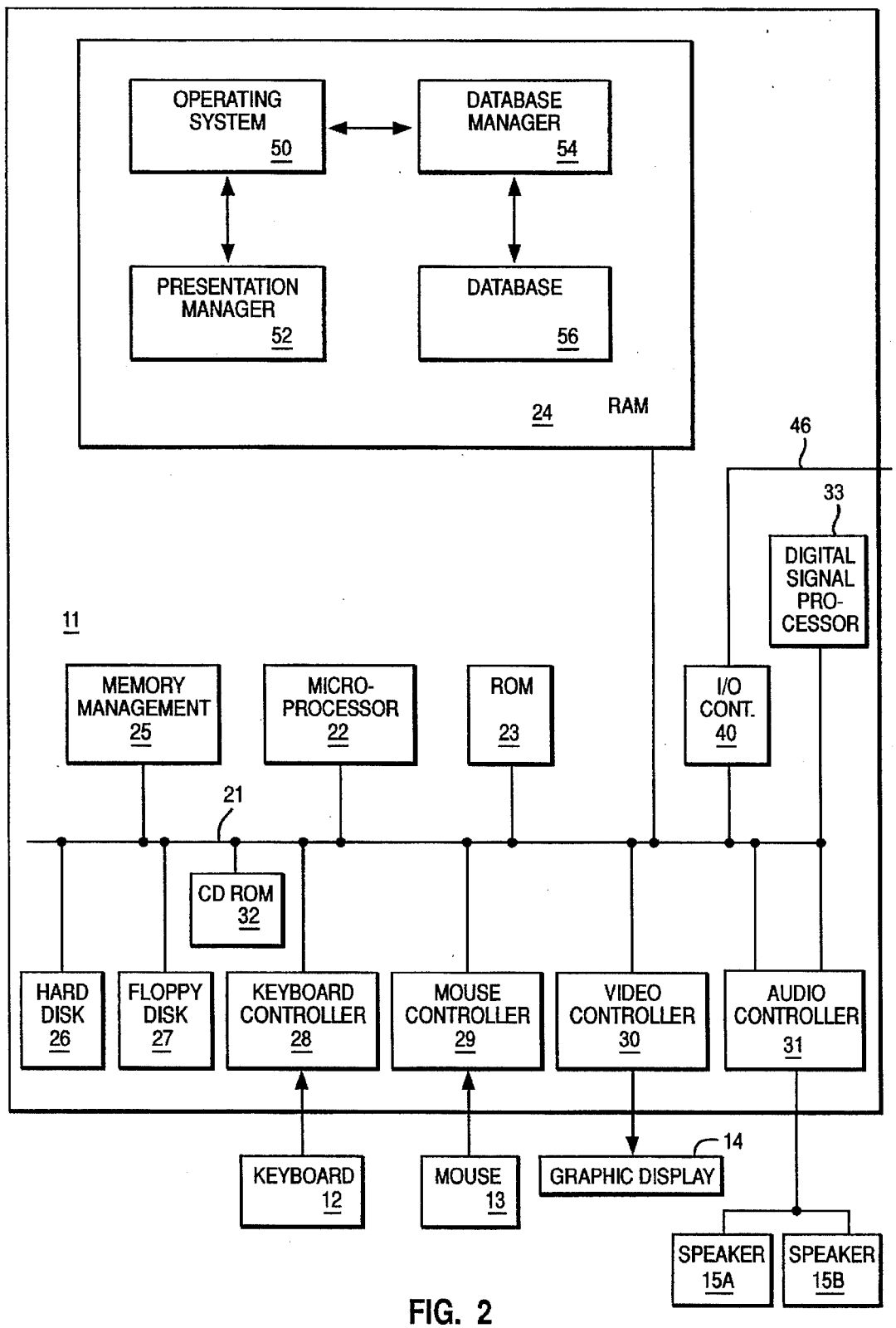
FIG. 2 is a block diagram of the components of the computer depicted in FIG. 1.

FIG. 2 shows a block diagram of the components of the personal computer shown in FIG. 1. The system unit 11 includes a system bus or plurality of system buses 21 to which various components are coupled and by which communication between the various components is accomplished. The microprocessor 22 is connected to the system bus 21 and is supported by read only memory (ROM) 23 and random access memory (RAM) 24 also connected to system bus 21. A microprocessor in the IBM multimedia Ps/2 series of computers is one of the Intel family of microprocessors including the 386 or 486 microprocessors. However, other microprocessors including, but not limited to, Motorola's family of microprocessors such as the 68000, 68020 or the 68030 microprocessors and various Reduced Instruction Set Computer (RISC) microprocessors manufactured by IBM, Hewlett Packard, Sun, Intel, Motorola and others may be used in the specific computer.

The ROM 23 contains among other code the Basic Input-Output system (BIOS) which controls basic hardware operations such as the interaction and the disk drives and the keyboard. The RAM 24 is the main memory into which the operating system and application programs are loaded. The memory management chip 25 is connected to the system bus 21 and controls direct memory access operations including, passing data between the RAM 24 and hard disk drive 26 and floppy disk drive 27. A CD ROM drive 32 also coupled to the system bus 21 is used to store a large amount of data.

Also connected to this system bus 21 are various I/O controllers: The keyboard controller 28, the mouse controller 29, the video controller 30, and the audio controller 31. As might be expected, the keyboard controller 28 provides the hardware interface for the keyboard 12, the mouse controller 29 provides the hardware interface for mouse 13, the video controller 30 is the hardware interface for the display 14, and the audio controller 31 is the hardware interface for the speakers 15a and 15b. Also coupled to the system bus 21 is digital signal processor 33 which corrects the sound produced by the speaker system and is preferably incorporated into the audio controller 31. The speakers 15a and 15b may be used to present audio objects to the user. An I/O controller 40 such as a Token Ring Adapter enables communication over a network 46 to other similarly configured data processing systems.

One of the preferred implementations of the present invention is as a set of instructions in a code module resident in the random access memory of the least one of the computers in the network. Until required by the computer system, the set of instructions may be stored in a another computer memory, for example, the hard disk in hard drive 26, or a removable computer memory such as an optical disk in the CD ROM 32 or a floppy disk in the floppy disk drive 27. As shown in the figure, the operating system 50 and presentation manager 52 are resident in RAM 24. In this example, the invention is embodied in a database manager 54 which cooperates with the operating system. The database manager 54 manages a database 56 which forms a portion of the parallel database system.

A parallel database system comprised of a plurality of computer systems coupled to a network is depicted in FIG.

3. Four computer systems or nodes 61, 63, 65, 67 are coupled together by means of a network 69. As discussed previously, the computer systems are typically personal computers or workstations. The network can be a Local Area Network, such as a Token Ring or Ethernet Network which conform to ISO and IEEE standards or a Wide Area Network including telecommunication links. Both the Token Ring or Ethernet Network conform IEEE and International Standard Organization standards for local area networks. The ISO family of standards are described in standard publications ISO 8802-2 (Logical Link Control Protocol), ISO 8802-3 (CSMA/CD Bus), ISO 8802-4 (Token passing bus), ISO 8802-5 (Token Passing Ring), and ISO 8802-7 (Slotted Ring).

The parallel database system stores a plurality of tables 62, 64, 66 and 68 at each of the nodes. Notice that a parallel database normally has redundant storage of the tables for fault tolerance purposes in case one node is unavailable. For example, if node 61 which holds tables 62 and 64 goes down, table 62 is available at node 65 and table 64 is available at node 67. As mentioned previously, a relational database is particularly useful within a PDB system. One of the better known languages for relational databases is the standard Structure Query Language (SQL). A search is defined in a query which defines the tables in which the data will be found. The table columns of interest, the conditions rows must satisfy, the order of columns, distinctiveness constraints, connections of data within tables and other relationships one also specified in the query. Within a PDB system, if the search query can not be satisfied using locally stored data, a remote call is made for other portions of the database stored at other nodes. For more information on relational databases, and in particular SQL and its uses, the reader is referred to *IBM Operating Systems/2 Extended Edition Database Managers Structured Query Language (SQL) Concepts Booklet* published by the IBM Corporation in 1991.

Figure 3:
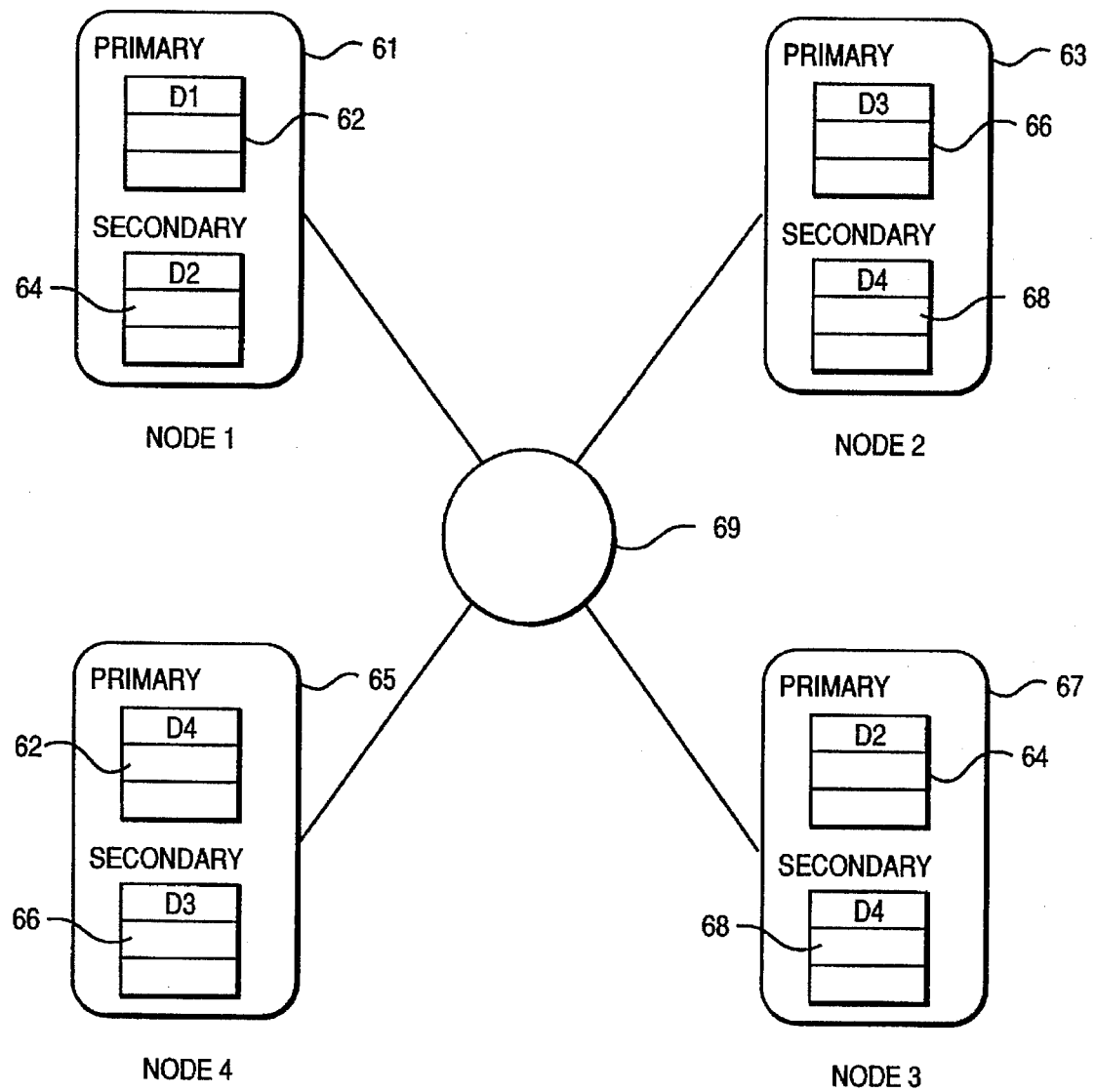
FIG. 3 depicts a parallel database system.
Figure 4:
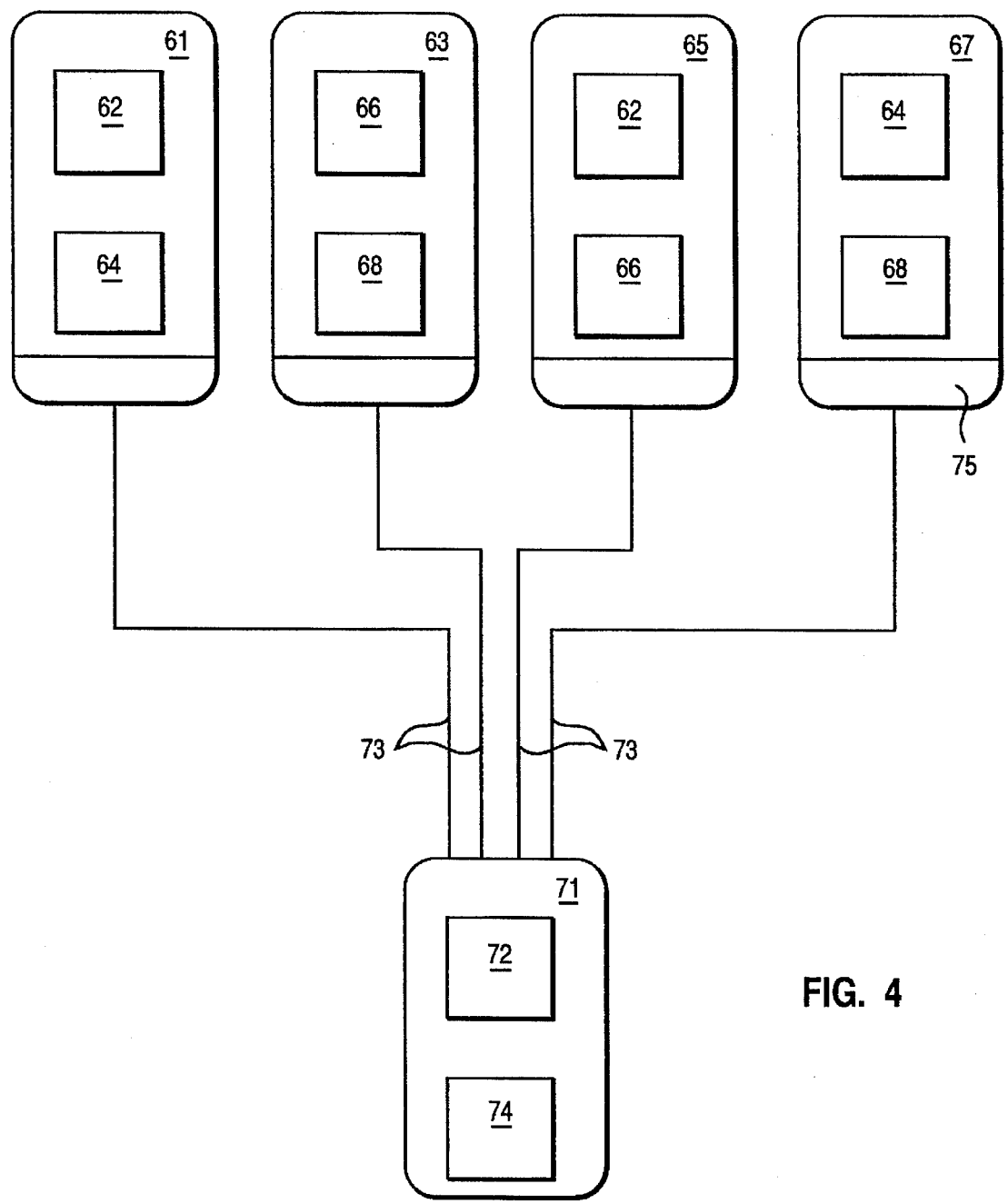
FIG. 4 depicts a parallel database system in which a new node is added.

The situation when a new node is added to the parallel database system is depicted in FIG. 4. New node 71, which will include tables 72 and 74 will be added to the network depicted in FIG. 3. Logical links 73 will be connected to each of the existing nodes 61, 63, 65, 67 to facilitate transfer of portions of the existing tables 62, 64, 66, 68 to the new node 71. A logical link is established by the transport layers which are located at each of the nodes and include communication buffers which store the portions of the tables existing nodes prior to transmission over the logical links to new node 71. The network connectivity to provide the logical link for communication is provided by network communications software 75. A variety of protocols can be supported for example, NetBIOS, SNA and TCP/IP. Information on the NetBIOS protocol can be found in *IBM Operating Systems/2 Local Area Network Server Version 2.0 Information and Planning Guide.* (G236-0162); *IBM Local Area Network Server Programs* (Specification sheet) (G360-2753); and *IBM Local Area Network Technical Reference.* (SC30-3383). The network communications software is in charge of setting up a session, confirming that messages are sent and received over the LAN, bundling data from the database to conform with network protocols, etc.

The communications software also places data which cannot be immediately transmitted over the LAN into a communications buffer. A communication buffer can store header information which stores communication control information, the actual data containing the data records to be transmitted and a end section indicating the end of the data records.

Figure 5:
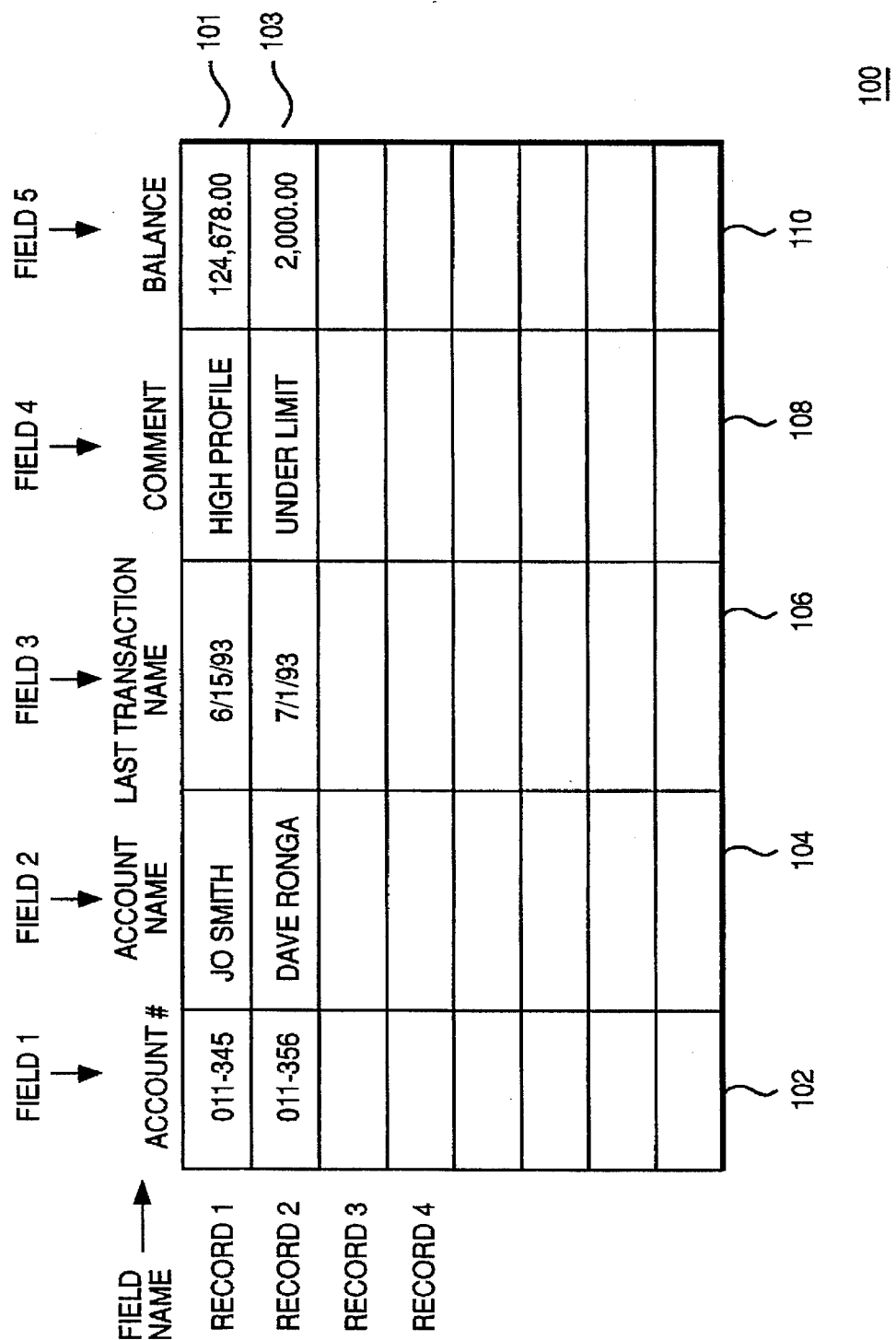
FIG. 5 depicts a table within a parallel database system.

A sample relational database table 100 is shown in FIG. 5. A table generally includes a plurality of records in rows with a corresponding set of fields in a set of columns. For example, record 1 in row 101 and record 2 in row 103 include data in a plurality of fields each of which is written to a particular column, for example, account number information is written to column 102 account name information is written to column 104, last transaction date information is written to column 106, comment information is written in column 108 and balance information is written in column 110. While only two records with only five fields are depicted in the figure, in practice, the relational database table can become exceedingly large comprising several pages of storage. As the relational databases grow too large to accommodate on existing nodes, a new node can be added to the parallel database system and portions of the tables on existing nodes can be redistributed.

Figure 6:
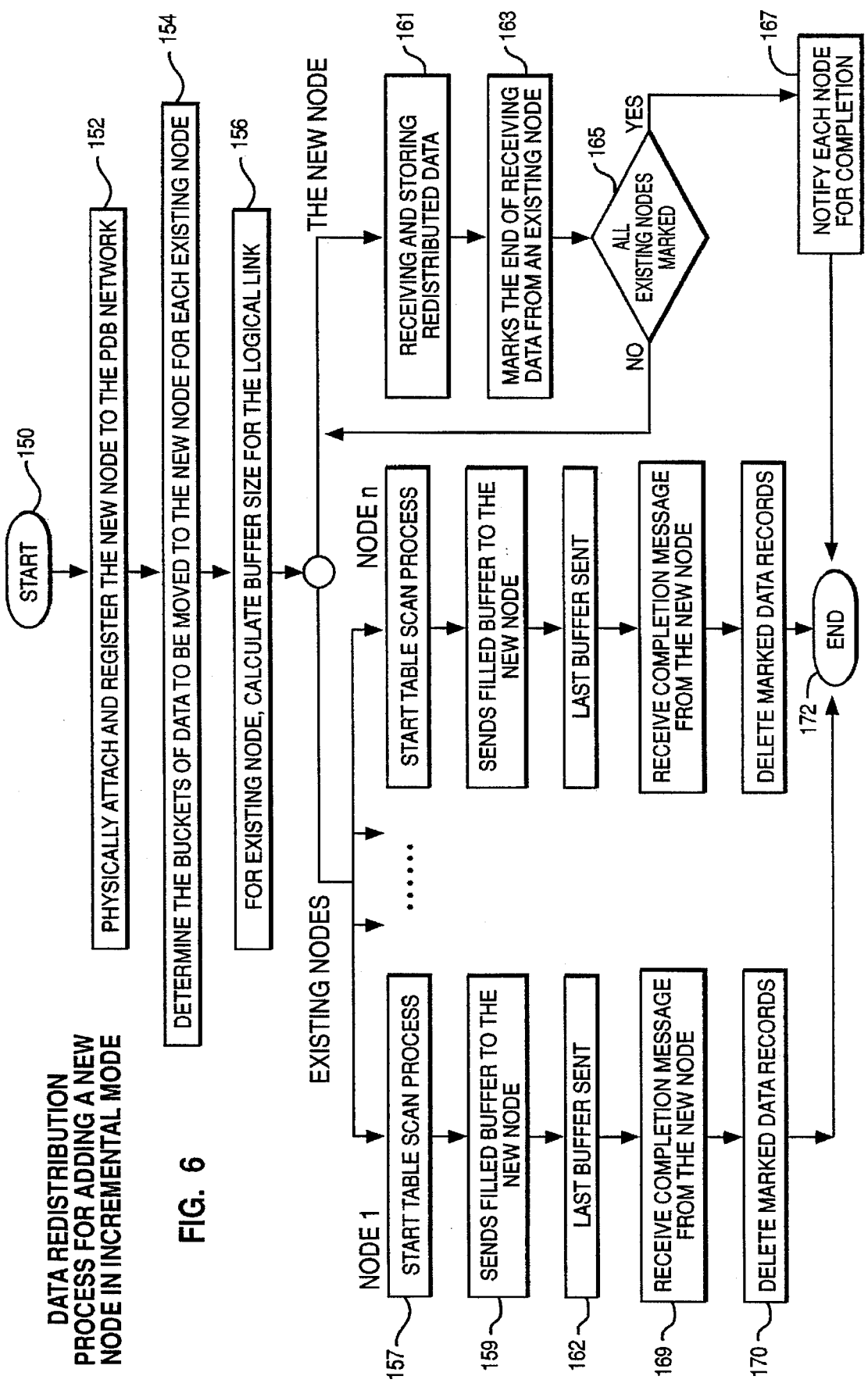
FIG. 6 depicts a flow diagram for redistributing data to a new node in a parallel database system.

The data redistribution process for adding a new node is depicted in FIG. 6. The process starts in step 150 and proceeds to step 152 where the new node is physically attached and registered to the parallel database network. In the registration process the node ID, network address, etc. are sent to a registration server node in the PDB system. Next, in step 154, the buckets of data to be moved to the new node are determined for each existing node. This step is depicted in greater detail in FIG. 6A.

Figure 7:
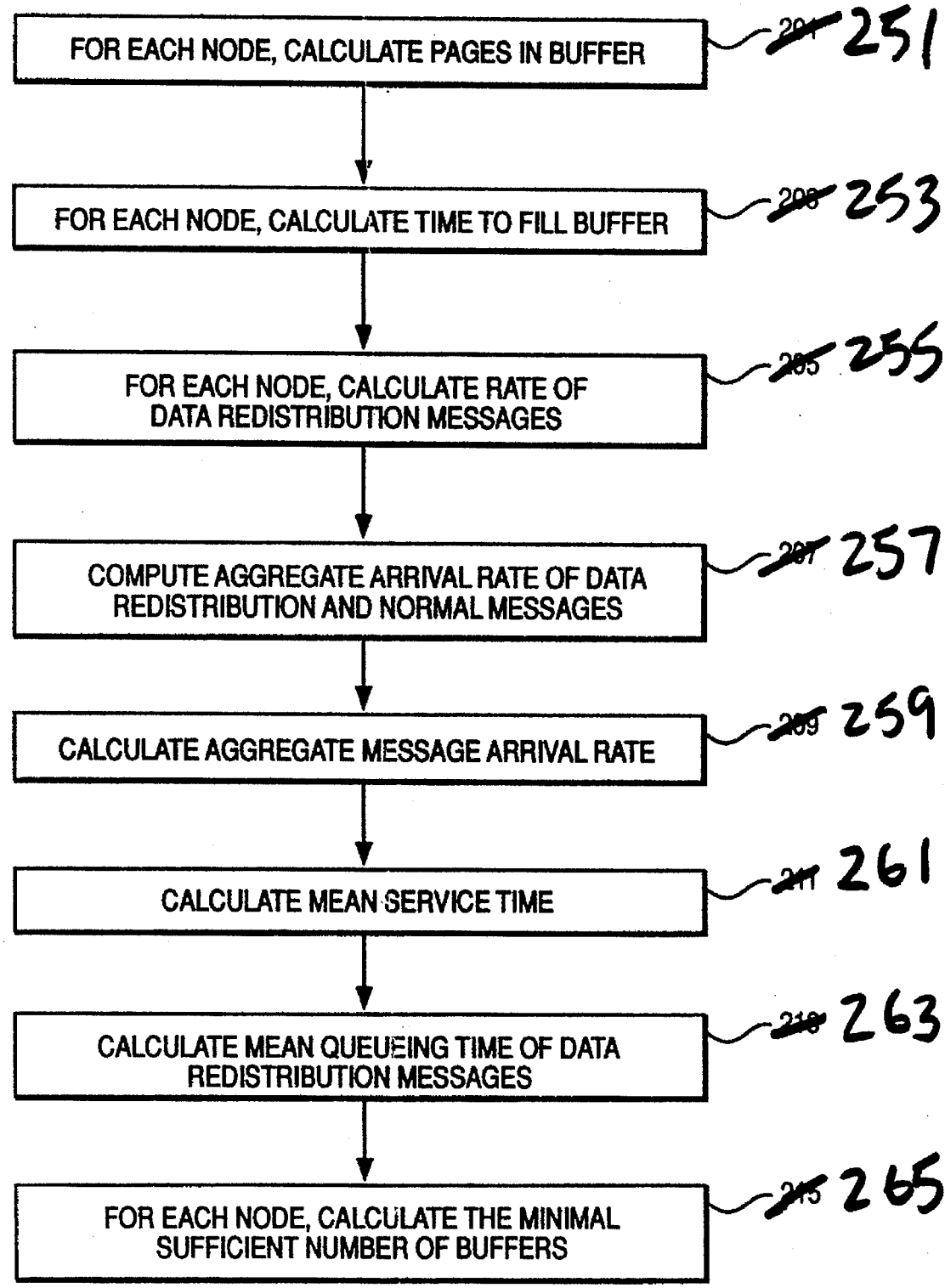
FIG. 7 depicts the process to calculate the minimum sufficient buffer space for data read distribution.

Next, in step 156, the necessary buffer size for the logical link is calculated for each existing node. Calculating the buffer size is depicted in greater detail in FIG. 7.

Steps 157, 159, 162, 169 and 170 are performed in each of the existing nodes; Steps 161, 163, 165 and 167 are performed in the new node being added to the parallel database system. In step 157, the table scan process is initiated. The table scan process is described in greater detail with reference to FIG. 8 below. Next, in step 159 the communication buffer which has been filled by the table scan process is sent to the new node. The new node receives and stores the redistributed data in step 161. In step 162, the last communication buffer is sent from the existing node to the new node Each communication buffer can contain a flag indicating the buffer is the last one or not. In step 163, the end of data reception from a given existing node is marked. A table in the receiving node stores resides in the receiving node. In step 165, a test is performed to determine whether all existing nodes are marked for end of data redistribution. If true, each existing node is notified that the reception of information is complete, step 167. In step 169, the completion message is received from the new node and in step 170 the marked data records which have been transferred to the new node are deleted from the tables in the existing nodes. The process ends, step 172.

In the quiescent-mode operation, load balancing is the primary goal. When adding new nodes to the PDB system, the ideal arrangement is shifting work load from the existing nodes to the new nodes to distribute the work load evenly. This is achieved by moving buckets from the existing nodes to the new nodes according to their work loads. As the PDB applications usually maintain a similar working pattern from time to time, it is reasonable to derive the ideal potential work load distribution based on the current work load information. Therefore, instead of simply selecting the hottest bucket from an existing node for data redistribution, it is more appropriate to select the buckets that can best reduce the node's load toward the ideal load.

When reaching load balancing in the PDB system, each node should have the same amount of work load. Thus, the ideal work load is the new average work load determined by: Wideal=(W/(N+K)), where W is the total work load of the entire PDB before adding the new nodes, N is the number of existing nodes, and K is the number of new nodes to be added. Using this ideal work load as a target, each node can locate the to-be-moved buckets by a process described below. The status monitor can provide the work load and size of each bucket.

Figure 6A:
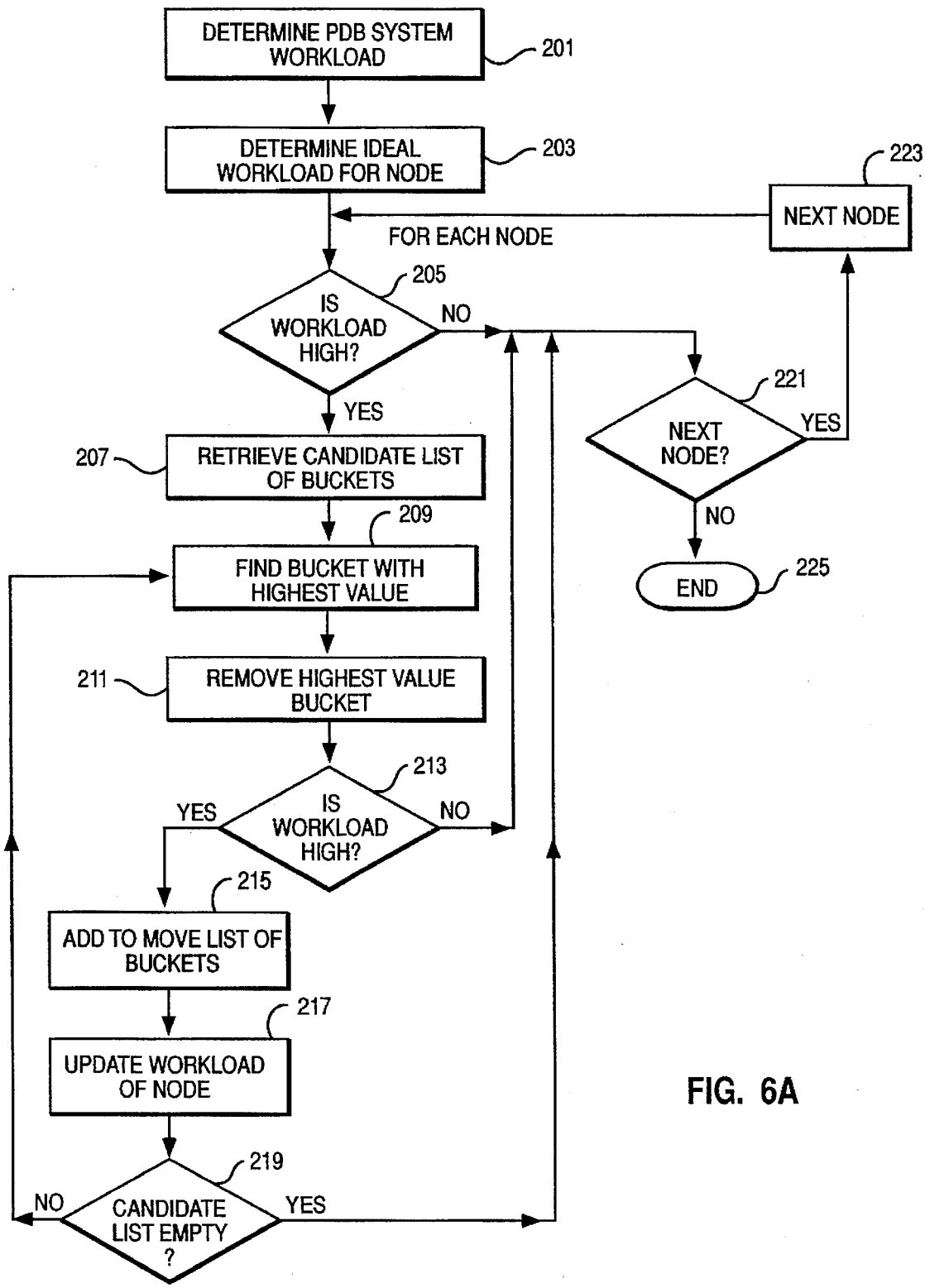
FIG. 6A is a flow diagram for determining from which table data may be redistributed.

The Average-Target workload process is a method that works on a node at a time. As shown in FIG. 6A, the total PDB system workload is determined in step 201. Next, in step 203 the ideal workload is calculated for the PDB system where the total workload is averaged over the existing node and any new nodes which are to be added to the PDB. If the test in step 205 is satisfied, the remainder of the steps in the flow diagram builds an ordered list for each node that describes the selected buckets for moving to the new nodes, List-Move. For each existing node, a list of candidates, Candidate_List, initially contains the numbers of all the buckets residing in this node, step 207. Then, from the Candidate_List, the process finds the bucket that has the highest value of workload. In one preferred embodiment, workload value is calculated according to the equation $W=W_1*(Work\text{-}load)-W_2*(Table\_size)-W_3*(Bucket\ size)-W_4*(\#records)$ where Work_load is the potential work load of this bucket and #_records is the number of data records in the bucket, step 209. $W_1$, $W_2$, $W_3$, and $W_4$ are appropriate weighing factors, determined by the usage and nature of the PDB system. Assuming that the usage of PDB is following a certain pattern, the history data of workload for each table on each node can be used as an important reference to determine the potential workload for each table on each node in the future usage. The W1 weighting factor is used to reflect the possible mapping from history data to possible future workload. W1 can be determined based statistical analysis on historical workload information. If a PDB system is used for running the same type of applications most of the time and the data are distributed into buckets randomly, it is very possible that the W1 factor's value would fall in the small range close to value 1.

The cost of moving a bucket in a specific table is usually determined by three factors: (1) The table size: Since the memory allocated for processing table scan is fixed, there will be more swappings between disk and memory for larger table. (2) The bucket size: Larger bucket means more data to be moved and higher communication cost. (3) The number of records: Table scan process needs to fetch and examine every record in the table. The larger number of records, the longer the process.

The values of the weighing factors, $W_2$, $W_3$, and $W_4$, is dependent on and can be determined by the configuration and performance of the PDB system and the communication software. The relative values among $W_2$, $W_3$, and $W_4$ can be determined with information comparing the speed of swapping, communication, and scanning processes. After $W_2$, $W_3$, and $W_4$ are determined relatively, $W_1$ value can be adjusted again to allow appropriate wrights between the workload and the cost of sending a bucket.

Next, in step 211, the highest value bucket is removed from the candidate list of buckets. In step 213, a test is performed to determine if the remaining work load is still above the ideal work load after moving this bucket according to the equation: $W_{rest}\text{-Work\_load} \geq W_{ideal}$ $W_{rest}\text{-Work\_load} \geq W_{ideal}$.

$W_{rest}$ is the work load on this node before moving out this bucket, Work_load is the workload of the highest value bucket.

If the comparison result is true, selecting this bucket is allowed. Then, in step 215, an entry (Table_Name, Bucket_Number) is placed into the List_Move for this node.

The workload for this node is updated by subtracting the workload from the highest value bucket from the remaining work load in step 217. A test is performed in step 219 to determine if the Candidate_List is empty. If not, the process returns to step 209, to determine the next highest value bucket. The process repeats until the test in step 219 determines that the candidate list is empty. The process then determines whether there are any additional nodes possible redistribution in step 221. If so, the next node is chosen in step 223. The process repeats until there are no more nodes to be tested and ends in step 225.

As mentioned above, the invention preferably uses queuing theory to calculate the amount of buffer space which should be set aside for the table scan operation. This is discussed in far greater detail in copending, commonly assigned, patent application, Ser. No. 08/116,087 to W. T. Chen et al. entitled "Minimal Sufficient Buffer Space for Data Redistribution in a Parallel Database System", pending.

The process begins in step 251, the number of pages to fill up the communication buffer is calculated for each node. Next, in step 253, the average time to fill a communication buffer in each node is determined for node. Next, in step 255, the arrival rate of data redistribution messages from node i to the new node, is calculated for each node.

Next, the aggregate arrival rate of data read distributions and that of the regular transaction messages are calculated in step 257.

Next, the aggregate message arrival rate at the new node is calculated in step 259. In step 261 the mean service time at the new node is determined. Next, in step 263, the mean queuing time of data redistribution messages is calculated.

Finally, in step 265 the minimal sufficient number of buffers is calculated for each node by the equation by dividing the mean queuing time by the average time to fill a buffer in the node.

Figure 8:
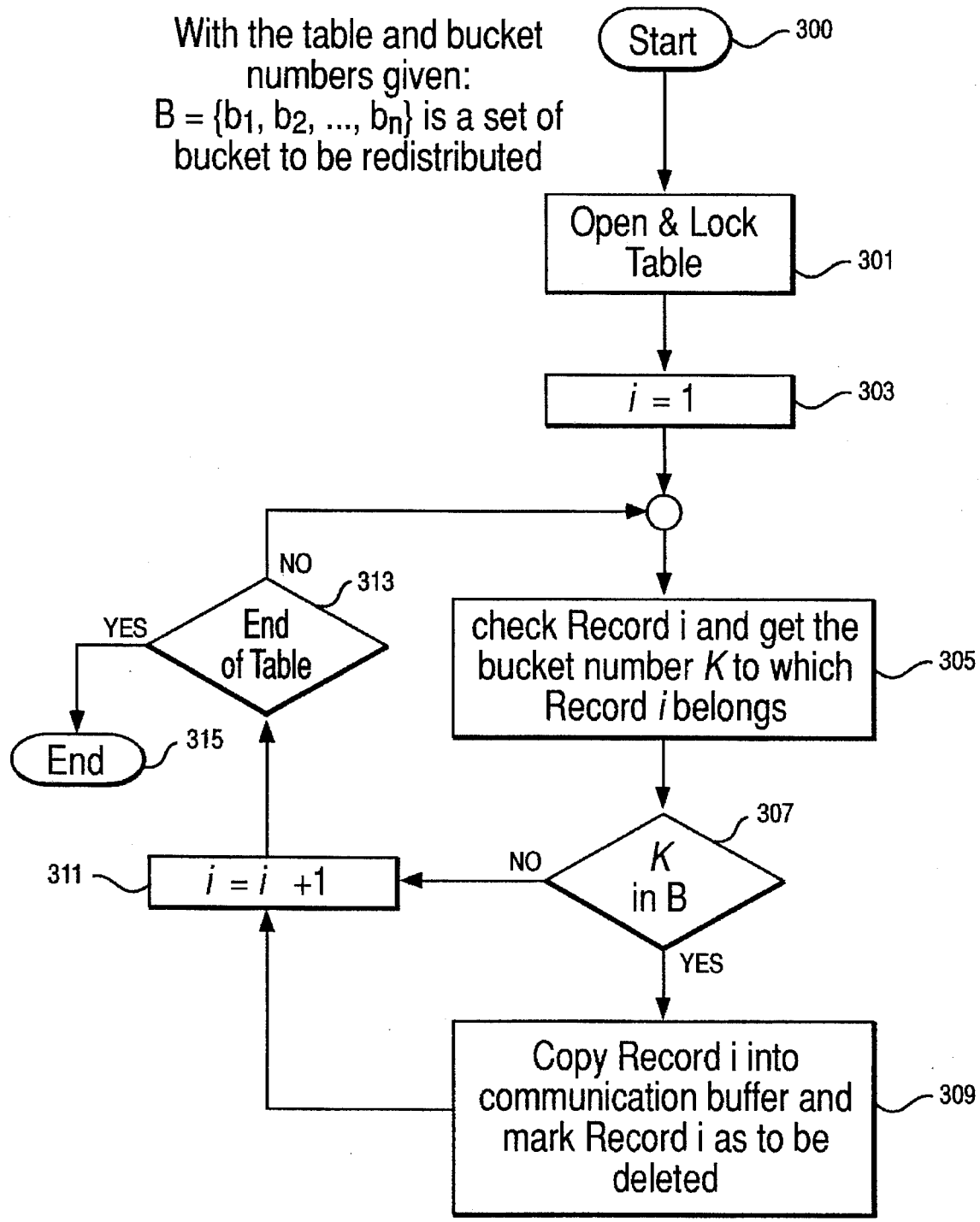
FIG. 8 is a flow diagram for a table scan operation.

The table scan process is depicted in FIG. 8. The process begins in step 300 when the table and bucket numbers within the table are given to the table scan process. With this information, the process opens and locks the table corresponding to the table number in step 301. In step 303, the process is set to check the first record in the table. In step 305, record i is checked and the bucket number k to which record i belongs is retrieved. In step 307, a test is performed to determine whether bucket number k is in the set of buckets to be redistributed. If it is, record i is copied into the communication buffer and record i is marked to be deleted once the redistribution process is complete, step 309. In step 311, the record number is incremented by one. In step 313, a test is performed to determine whether the table can process is reached the end of the table. If not, the process resumes checking records to determine whether they belong to the set of buckets to be redistributed. If the end of the table is reached, the process ends in step 315.

Figure 9:
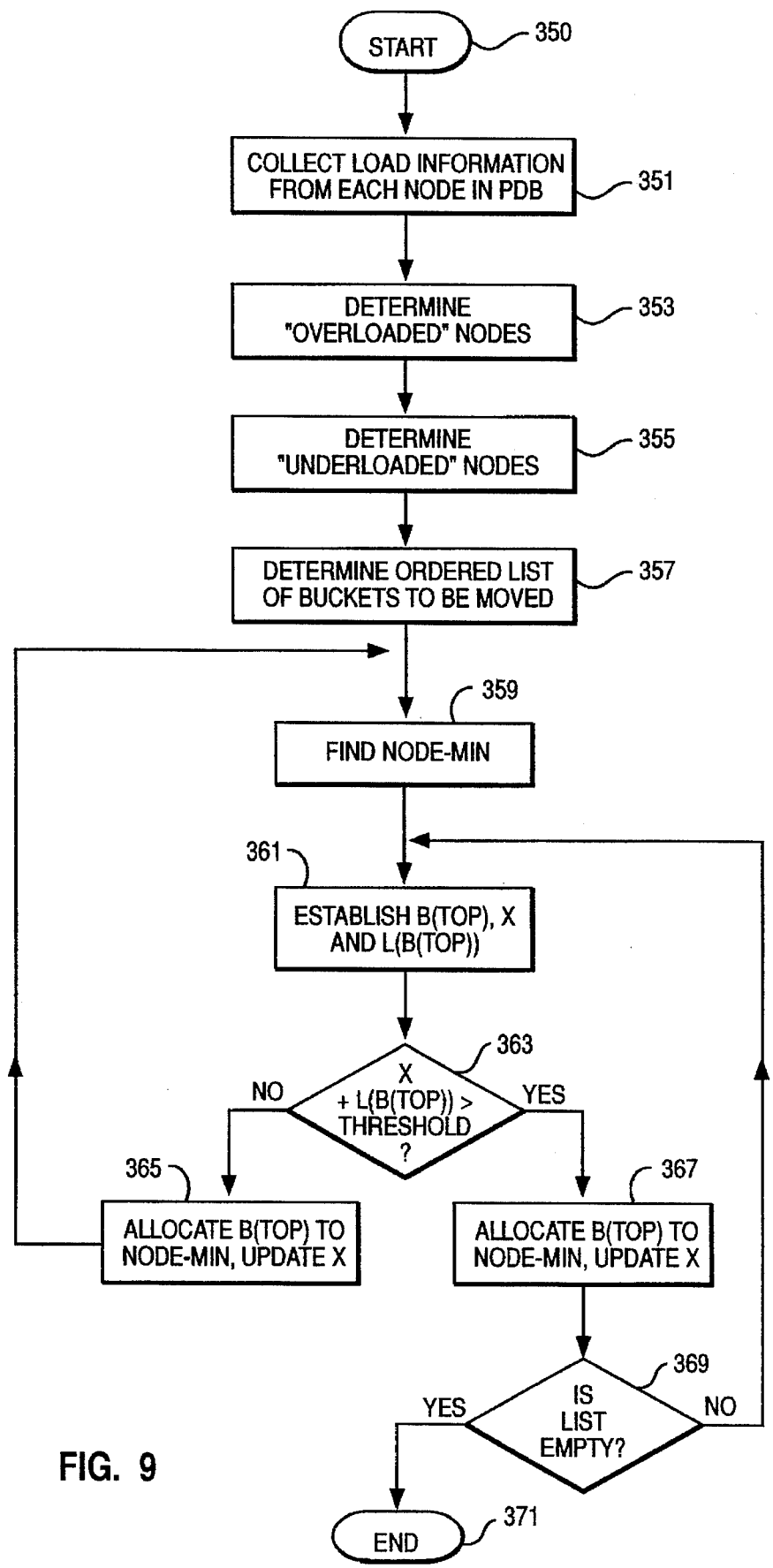
FIG. 9 is a flow diagram for determining an imbalanced condition in a parallel database system.

While the description above has concentrated on redistributing data when a new node is added into the parallel database system, the invention may also be used when the PDB system becomes imbalanced. The process for determining whether the PDB is unbalanced is depicted in FIG. 9. The process begins in step 350 and continues immediately to step 351, where the data load information is collected from each node in the PDB system. Next, in step 353, the nodes which have a data load over a predetermined threshold level are determined and classified as "overloaded". Next, in step 355, the nodes which have a load lower than a predetermined minimal standard are determined and classified as "underloaded". In step 357, an ordered list of bucket to be moved in the overloaded nodes is established. Preferably, the list is arranged in the order of bucket size and includes information such as bucket number, bucket size and node id.

The node in the underloaded category which has the least planned load is determined, and assigned the name Node-min. Planned load is determined according to the equation, planned load equals the current load plus the loads from buckets planned to be moved into the node, step 359. Next, in step 361, the top bucket in the ordered list of buckets to be moved and, X, the tentative planned load of Node-min are retrieved. L(B(top)) is determined, which is a potential load caused by the data in bucket B(Top). Next, a test is made in step 363, to determine whether the sum of X plus L(B(Top)) is greater than the predetermined threshold level. If not, in step 365, the top bucket is allocated to the Node-min and B(top) is removed from the ordered list of buckets. Additionally, X, the tentative planned load of Node-min is updated. The process continues in this loop until the tentative planned load exceeds the threshold level. Once this is true, the top bucket is allocated to Node-min and removed from ordered list and Node-min's planned load is updated in step 367. Next, in test 369, the process determines whether the list of buckets to be moved is empty. If not, i.e., there are more buckets to be moved, the process returns to find the new Node-min which has the least planned load and repeats the process as described above. If there are no more buckets to be moved, the process ends, step 371.

While the invention has been described with respect to particular embodiments above, it will be understood by those skilled in the art that modifications may be made without departing from the spirit and scope of the present invention. These embodiments are for purposes of example and illustration only and are not to be taken to limit the scope of the invention narrower than the scope of the appended claims.

I claim:

1. A method for determining which data stored in the nodes in a parallel database system to redistribute to a receiving node, comprising the steps of:

calculating an average workload for the nodes within the parallel database system;

determining a transmitting node having a workload which exceeds the average workload;

selecting redistributable data which when redistributed from the transmitting node to the receiving node will lower the transmitting node workload toward the average workload; and redistributing the redistributable data from the transmitting node to the receiving node.

2. The method as recited in claim 1 wherein the selecting step further comprises the steps of:

ordering a list of redistributable candidate data sets according to a redistribution value of each respective candidate data set;

subtracting a workload associated with a first candidate data set having a highest redistribution value from the transmitting node workload; and selecting the first candidate data set, as a redistributable data set, if a result of the subtracting step is greater than or equal to the average workload.

3. The method as recited in claim 2 wherein the steps are repeated for a plurality of transmitting nodes each of which has a workload greater than the average workload.

4. The method as recited in claim 1 wherein the receiving node is a new node to the parallel database system.

5. The method as recited in claim 1 wherein the receiving node is an underutilized node in the parallel database system.

6. A system for determining which data stored in the nodes in a parallel database system to redistribute to a receiving node, comprising:

means for calculating an average workload for the nodes within the parallel database;

means for determining a transmitting node having a workload which exceeds the average workload;

means for selecting redistributable data which when redistributed from the transmitting node to the receiving node will lower the transmitting node workload toward the average workload; and means for redistributing the redistributable data from the transmitting node to the receiving node.

7. The system as recited in claim 6 wherein the selecting means further comprises:

means for ordering a list of redistributable candidate data sets according to a redistribution value of each respective candidate data set;

means for subtracting a workload associated with a first candidate data set having a highest redistribution value from the transmitting node workload; and means for selecting the first candidate data set as a first redistributable data set, responsive to a determination that the transmitting node workload after redistributing the first candidate set would be greater than or equal to the average workload.

8. The system as recited in claim 7 wherein data sets from a plurality of transmitting nodes each of which has a workload greater than the average workload are redistributed.

9. The system as recited in claim 6 wherein the receiving node is a new node to the parallel database system.

10. The system as recited in claim 6 wherein the receiving node is an underutilized node in the parallel database system.

11. A computer program product in a computer readable memory for determining which data stored in the nodes in a parallel database system to redistribute to a receiving node, comprising:

means for calculating an average workload for the nodes within the parallel database;

means for determining a transmitting node having a workload which exceeds the average workload;

means for selecting redistributable data which when redistributed from the transmitting node to the receiving node will lower the transmitting node workload toward the average workload; and means for redistributing the redistributable data from the transmitting node to the receiving node.

12. The product as recited in claim 11 wherein the selecting means further comprises:

means for ordering a list of redistributable candidate data sets according to a redistribution value of each respective candidate data set;

means for subtracting a workload associated with a first candidate data set having a highest redistribution value from the transmitting node workload; and means for selecting the first candidate data set as a first redistributable data set, responsive to a determination that the transmitting node workload after redistributing the first candidate set would be greater than or equal to the average workload.

13. The product as recited in claim 12 wherein data sets from a plurality of transmitting nodes each of which has a workload greater than the average workload are redistributed.

14. The product as recited in claim 11 wherein the receiving node is a new node to the parallel database system.

15. The product as recited in claim 11 wherein the receiving node is an underutilized node in the parallel database system.

\* \* \* \* \*